United States Patent [19]

Randle et al.

[11] Patent Number: 4,728,925

[45] Date of Patent: Mar. 1, 1988

[54] DATA COMMUNICATIONS ANALYZER

[75] Inventors: William C. Randle, Bend; Dennis L. Holmbo, Redmond; Kenneth D. Spencer, Bend, all of Oreg.

[73] Assignee: Tektronix, Inc., Beaverton, Oreg.

[21] Appl. No.: 752,225

[22] Filed: Jul. 3, 1985

[51] Int. Cl.⁴ .............................................. G05B 1/00
[52] U.S. Cl. ................................................... 340/146.2
[58] Field of Search ................................. 340/146.2; 364/200 MS File, 900 MS File, 131, 712, 728, 725

[56] References Cited

U.S. PATENT DOCUMENTS

| | | | |
|---|---|---|---|
| 3,905,018 | 9/1975 | Gray | 340/146.2 |
| 4,318,184 | 3/1982 | Millett et al. | 364/900 |
| 4,414,685 | 11/1983 | Sternberg | 364/725 |
| 4,471,459 | 9/1984 | Dickinson et al. | 364/900 |
| 4,499,553 | 2/1985 | Dickinson et al. | 364/900 |
| 4,503,495 | 3/1985 | Boudreau | 364/200 |

*Primary Examiner*—Gary V. Harkcom
*Assistant Examiner*—Long Thanh Nguyen
*Attorney, Agent, or Firm*—Francis I. Gray; John Smith-Hill

[57] ABSTRACT

Apparatus for comparing a stream of data characters with a predetermined string of test characters has an input device for receiving the stream of data characters and a main processor for generating the predetermined string of test characters. A hardware register receives the predetermined string of test characters from the main processor, and a comparator device compares the stream of data characters with the contents of the register device and generates a response in the event that a portion of the stream is identical to the string of test characters generated by the main processor. A second processor receives the response and sends a report to the main processor.

6 Claims, 2 Drawing Figures

DATA COMMUNICATIONS ANALYZER

This invention relates to apparatus for comparing a stream of data characters with a predetermined string of test characters.

BACKGROUND OF THE INVENTION

In general, a data communications analyzer has at least two modes of operation, namely the monitor mode and the simulate mode. In the monitor mode, the analyzer receives the serial data that passes along a communications interface between two nodes of a data communication network, e. g. two computers, and observes passively the stream of data passing between the nodes. In the simulate mode, the analyzer becomes a node in the data communication network, and appears to other nodes to be, for example, a host computer or a terminal. Thus, in the simulate mode the analyzer is able to both send and receive serial data. In the monitor mode, and when receiving data in the simulate mode, the analyzer converts the received serial data into parallel form and examines the stream of parallel characters to identify the occurrence of particular character strings.

A known data communications analyzer comprises the functional elements shown within the dashed outline 14 in FIG. 1 of the accompanying drawings. The known analyzer includes a main processor 2 that has a data bus 4, a read only memory (ROM) 6 that contains the firmware for operation of the processor 2, a read/-write memory 8, a serial/parallel interface device 10 and a user interface 12. The main processor is a Z80 microprocessor and the serial/parallel interface 10 is a Z80 SIO (serial in out) peripheral. The user interface 12 comprises a keyboard and a display, and includes its own processor. At the start of a test, the operator of the analyzer enters information into the keyboard defining characters that the network under test is to be examined for. These test characters are transmitted to the main processor 2, which loads them into the memory 8. During the test, the analyzer receives serial data, for example through an RS-232C port. The SIO 10 assembles the serial data into a stream of parallel data characters and, acting through normal interrupt routines, places those data characters on the data bus 4 and transmits them to the main processor 2. In order to determine whether a data character is the same as a test character, the processor fetches a test character from the memory 8 and compares it with the data character. If the test is to locate a set of characters in a predetermined order, the processor 2 examines the stream of data characters until it identifies a coincidence with the first test character, and then it examines the next data character to determine whether there is a coincidence with the second test character. If there is no coincidence, the test is started again, looking for a data character that is the same as the first test character, but if coincidence is found, the next data character is examined against the third test character, and so on. If the data character stream includes a sequence of characters that is the same as the test character string, the processor 2 causes the processor to generate display codes that are sent to the user interface 12 to cause the display to provide an appropriate visual message.

In addition to examining the data character stream for a sequence of characters that is the same as the test character string, the analyzer may examine the data character stream for an end of frame (EOF) character or character string. When the EOF character or string of characters is identified, an appropriate report is generated and a display code is transmitted to the user interface 12 in response to the report.

During a test, the data characters that have been received are loaded by the main processor 2 into a capture buffer within the memory 8 for storage and subsequent review. Since the number of characters that can be stored is limited by the size of the capture buffer, the analyzer continuously monitors the data stream for the RR (receive ready) state that is used in the SDLC protocol, and rejects that state from entry into the capture buffer. This is because the RR state is frequently used as an idle condition, and it is not desirable that space in the capture buffer be taken up by characters that are not useful in analyzing operation of the network under test.

The maximum data rate that can be accommodated using the known analyzer is limited because the comparison between each data character and the appropriate test character is performed by a software routine, and the speed with which the comparison can be effected is limited by the operating speed of the processor. Moreover, the processor is also required to control the loading of data into the capture buffer and to generate the trigger reports.

SUMMARY OF THE INVENTION

In accordance with a preferred embodiment of the invention, apparatus for comparing a stream of data characters with a predetermined string of test characters has an input device for receiving the stream of data characters and distributing the data characters to a first processor, a second processor and a register device. The first processor also generates the predetermined string of test characters, and applies this predetermined string of test characters to the register device. A comparator device compares the stream of data characters with the predetermined string of test characters received from the first processor, and generates a response in the event that a portion of the stream is identical to the predetermined string. The second processor receives the response and sends a report to the first processor.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
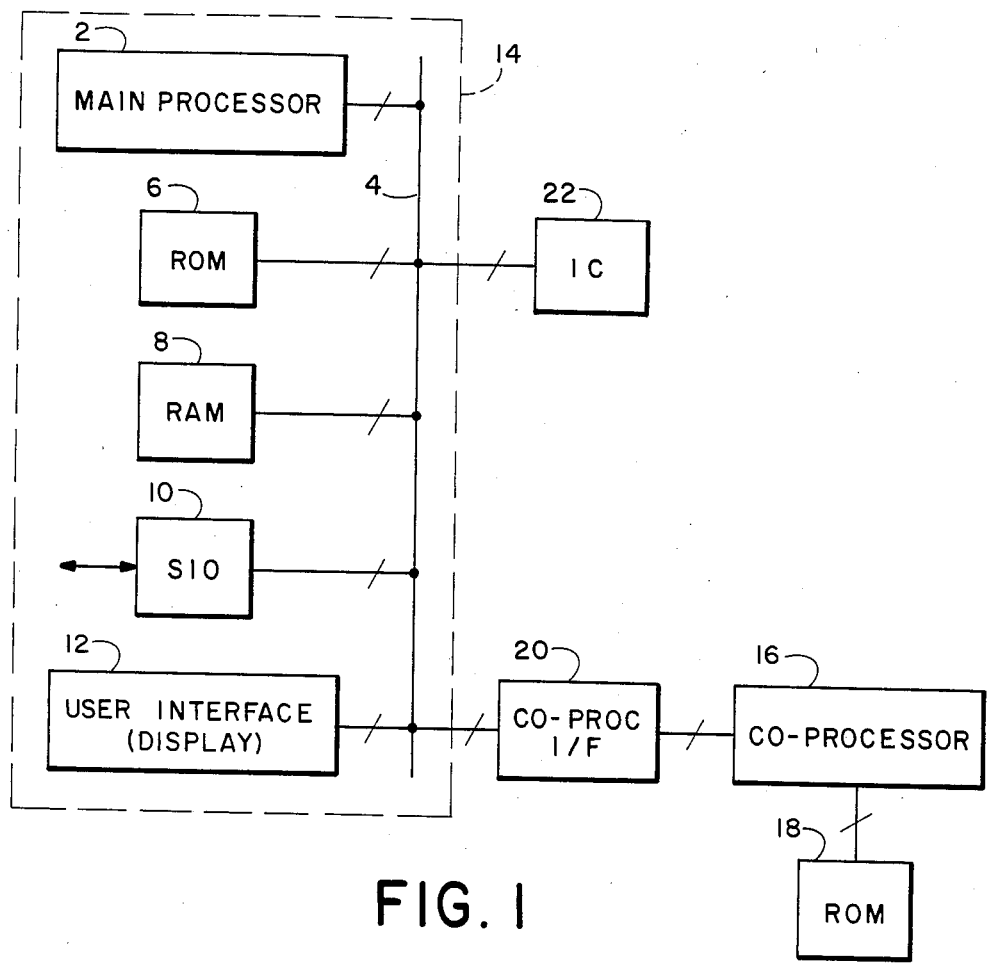
FIG. 1 is a block diagram of a data communications analyzer.

The speed of operation of the known analyzer may be increased by distributing the processing tasks between the main processor 2 and a co-processor. Thus, as shown outside the block 14 of FIG. 1, a co-processor 16, having its operating system firmware in a ROM 18, is connected to the data bus 4 through a co-processor interface 20. Preferably, the co-processor 16 is a Z8 microprocessor, and the interface 20 comprises an interrupt controller and a latch, as described in co-pending U.S. patent application Ser. No. 752,226 filed July 3, 1985 by Dennis L. Holmbo entitled "Microprocessor Interface Device", the contents of which are hereby incorporated by reference herein. Also connected to the data bus 4 is an integrated circuit 22 that carries out the comparison operation between data characters and test characters in hardware, and thus much more quickly than can be accomplished by use of the software comparison routine described above.

Figure 2:
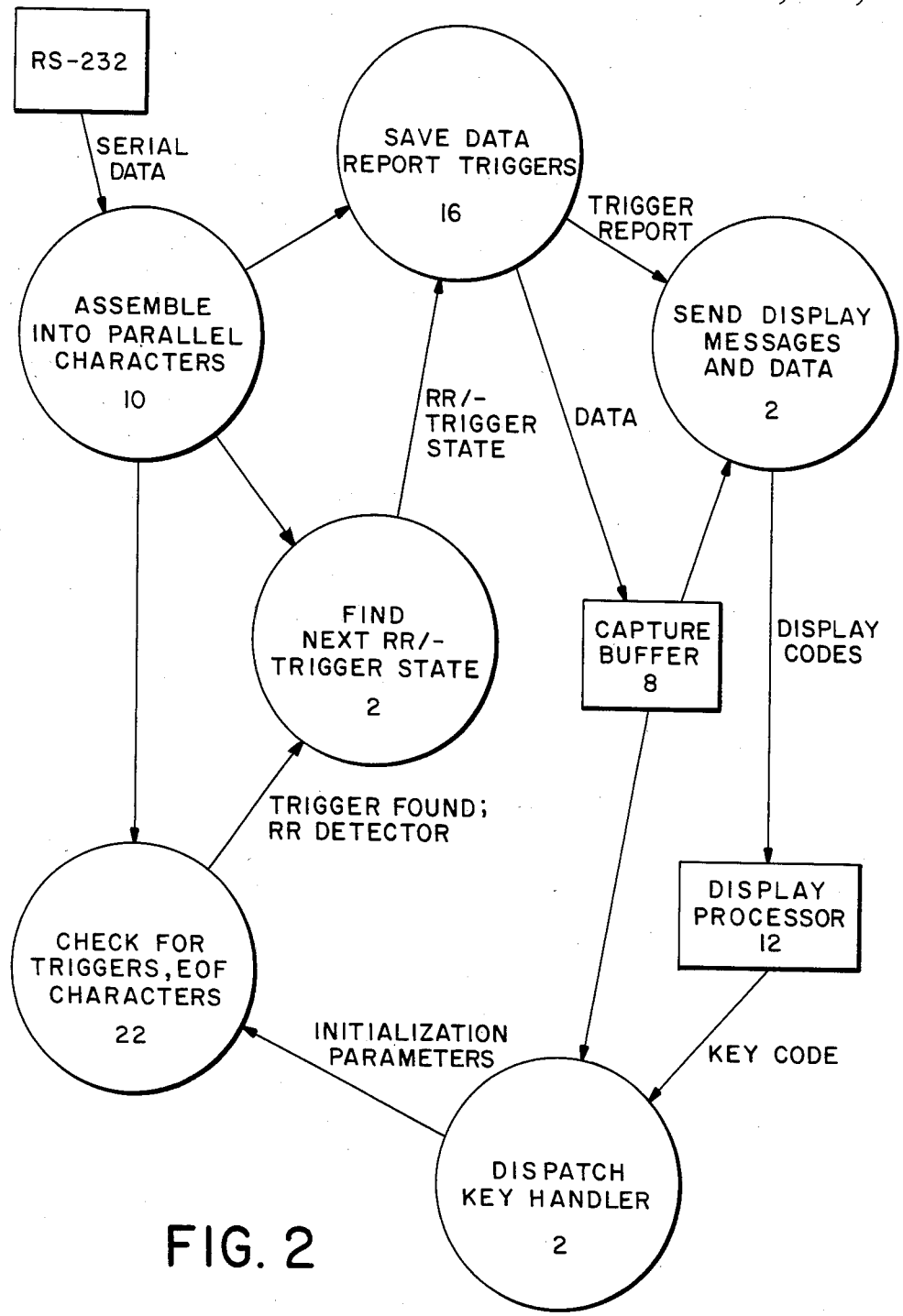
FIG. 2 is a chart illustrating data flow in the FIG. 1 analyzer.

The data flow that takes place in the analyzer shown in FIG. 1, using the elements outside the block 14, is shown in FIG. 2. On initial start-up, the user enters information pertaining to the test that is to be performed by way of the keyboard, and this causes a sequence of key codes, identifying the keys that have been actuated by the user, to be generated. The key codes are transmitted to the processor 2. The processor 2 determines whether any special functions are associated with the particular keys that have been actuated, and carries out any necessary special functions. For example, if the user actuates the start key, and the display processor transmits the start key's key code to the processor 2, the processor 2 generates initialization parameters that it transmits to the IC 22. In addition, the processor 2 dispatches a request to the co-processor 16 to initialize itself for data processing, and initializes the SIO 10 to receive a data stream. When these key handler routines have been completed, the analyzer is ready to carry out a test.

The initialization parameters that are transmitted to the IC 22 include a reference string of up to 25 test characters that are loaded into registers included in the IC 22 for comparison with the data characters using comparators included in the IC 22. Data is received through the RS-232C port and, as before, is assembled into characters by the SIO 10. Under control of the main processor 2, the data characters are read by the co-processor 16 and the IC 22. The IC 22 compares each data character with the string of test characters in order to detect a trigger (i.e. coincidence between a string of data characters and the predetermined string of test characters) and, upon detecting a trigger, causes the processor 2 to generate a signal that is transmitted to the processor 16. The IC 22 also compares the data characters with the characters representing the RR state. If the IC 22 finds a trigger, or detects the RR state, it causes the processor 2 to generate a signal that is sent to the co-processor 16 indicating that the next character that will be received by the coprocessor is a trigger or represents the RR state. (The indication relates to the next character rather than the current character because the co-processor operates one character behind the IC 22 and the main processor.) The co-processor 16 receives the data stream and controls the loading of the data characters (excluding those representing the RR state, as notified by the processor 2) into the capture buffer of the memory 8. In addition, the co-processor 16 generates pointers that identify the locations in the capture buffer of the data characters at which triggers occur and loads the pointers into the RAM 8, and sends trigger reports to the main processor 2. The trigger reports are used by the main processor 2 to generate display codes that are transmitted to the user interface 12 and cause it to generate an appropriate display, indicating, e.g., that a particular trigger has been found. When the test has been completed, the user is able to review the data stored in the capture buffer and, with the aid of the trigger pointers, identify the data characters at which triggers occurred.

The main processor 2 controls the start and stop of operations by the co-processor 16, but does not interfere with normal operation of the co-processor. The two processors communicate by use of interrupts (the co-processor 16 is able to cause the main processor 2 to execute an interrupt routine). Moreover, since both processors have access to the memory 8, they are able to communicate by use of shared variables in that memory.

The user of the analyzer, using known techniques, may program the main processor 2 so that in the monitor mode the comparison is effected only against data passing over the network in one direction, only against data passing in the opposite direction, or against data passing in both directions. A second integrated circuit, identical to the IC 22, may be used in similar manner to the IC 22, so that one IC makes a comparison against data passing in one direction and the other IC makes a comparison against data passing in the opposite direction.

It will be seen that in the data communications analyzer embodying the present invention, the tasks that are performed in the known analyzer by the main processor 2 alone are shared among the main processor, the IC 22 and the co-processor 16, and that the comparisons between the character data and the test characters are performed in hardware rather than by execution of software routines. Accordingly, the data communications analyzer embodying the invention is able to operate at considerably higher data rates than the known data communications analyzer.

It will be appreciated that the present invention is not restricted to the particular apparatus that has been shown and described, and that variations may be made therein without departing from the scope of the invention as defined in the appended claims, and equivalents thereof.

We claim:

1. Apparatus for comparing a stream of data characters with a predetermined string of test characters comprising:
   a common bus;
   an input device connected to the common bus for receiving the stream of data characters;
   a first processor connected to the common bus for generating said predetermined string of test characters;
   register means connected to the common bus for receiving the predetermined string of test characters from the first processor;
   comparator means connected to the common bus for comparing the stream of data characters from the input device with the contents of the register means and generating a response in the event that a protion of the stream is identical to said string; and
   a second processor connected to the common bus for receiving said response and sending a report to the first processor.

2. Apparatus according to claim 1, wherein the register means and the comparator means are incorporated in a common monolithic integrated circuit connected to the common bus.

3. Apparatus according to claim 1, wherein the second processor is connected to the common bus through an interface device.

4. Apparatus according to claim 1, wherein the first processor uses the report sent by the second processor to cause a display connected to the common bus to provide a visual message.

5. Apparatus according to claim 1, wherein the second processor controls loading of the data characters into a random access memory connected to the common bus.

6. An improved data communications analyzer for comparing a stream of data charaters with a predetermined string of test characters of the type having a processor, an input/output port and a user interface including a display, all interconnected via a common bus, wherein the improvement comprises:
   a register and comparator connected to the common bus for storing the predetermined string and for comparing the stream of data characters with the predetermined string to generate a response in the event a portion of the stream of data characters is identical to the predetermined string; and
   a co-processor connected to the common bus for sending a report to the processor when the response is received from the register and comparator.

* * * * *